US011888259B2

(12) United States Patent
Obie et al.

(10) Patent No.: US 11,888,259 B2

(45) Date of Patent: Jan. 30, 2024

(54) CONNECTOR

(71) Applicant: J.S.T. MFG. CO., LTD., Tokyo (JP)

(72) Inventors: Naoki Obie, Miyoshi (JP); Yuji Miyazaki, Miyoshi (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 224 days.

(21) Appl. No.: 17/548,313

(22) Filed: Dec. 10, 2021

(65) Prior Publication Data

US 2022/0209459 A1 Jun. 30, 2022

(30) Foreign Application Priority Data

Dec. 28, 2020 (JP) ................................ 2020-218410

(51) Int. Cl.

*H01R 13/629* (2006.01)
*H01R 13/502* (2006.01)
(Continued)

(52) U.S. Cl.

CPC ........... *H01R 13/629* (2013.01); *H01R 13/42* (2013.01); *H01R 13/502* (2013.01); *H01R 13/639* (2013.01)

(58) Field of Classification Search

CPC .... H01R 13/629; H01R 13/42; H01R 13/502; H01R 13/639; H01R 13/4362
See application file for complete search history.

(56) References Cited

U.S. PATENT DOCUMENTS 5,358,427 A * 10/1994 Miwa ................ H01R 13/4362 439/752
5,464,353 A * 11/1995 Saijo ................. H01R 13/6272 439/489
(Continued)

FOREIGN PATENT DOCUMENTS

JP 2020-115409 A 7/2020

*Primary Examiner* — Abdullah A Riyami
*Assistant Examiner* — Nader J Alhawamdeh
(74) *Attorney, Agent, or Firm* — Kratz, Quintos & Hanson, LLP

(57) ABSTRACT

A retainer is inserted and fitted into an engagement hole that is open in a first direction of a housing where the first direction, a second direction, and a third direction are defined as mutually-orthogonal three directions. An engagement portion is disposed at each of a pair of inner wall surfaces facing each other in the second direction in an inner peripheral wall of the engagement hole. The retainer includes a pair of first outer surfaces facing each other in the first direction, a pair of second outer surfaces facing each other in the second direction, and a pair of third outer surfaces facing each other in the third direction. A long hole passing through the third outer surface in the third direction is formed so as to be adjacent to each of the second outer surfaces, and extends in the first direction defined as a longitudinal direction. A beam portion supported at both ends by a pair of longitudinal-direction end portions is formed between the long hole and the second outer surface. An engagement projection that engages with the engagement portion is formed at an intermediate portion in the longitudinal direction of the beam portion. A stress relaxation structure that relaxes stress acting on the intermediate portion of the beam portion includes a hole expanding portion that expands at least one of the pair of longitudinal-direction end portions of the long hole in a lateral direction.

8 Claims, 10 Drawing Sheets

(51) Int. Cl.
*H01R 13/639* (2006.01)
*H01R 13/42* (2006.01)

(56) References Cited

U.S. PATENT DOCUMENTS

| | | | | |
|---|---|---|---|---|
| 9,318,847 | B2 * | 4/2016 | Endo | H01R 13/639 |
| 2001/0031574 | A1 * | 10/2001 | Morita | H01R 4/184<br>439/404 |
| 2022/0209459 | A1 * | 6/2022 | Obie | H01R 13/42 |

* cited by examiner

CONNECTOR

CROSS REFERENCE TO RELATED APPLICATION

This application corresponds to Japanese Patent Application No. 2020-218410 filed in the Japan Patent Office on Dec. 28, 2020, the entire disclosure of which is incorporated herein by reference.

BACKGROUND OF THE INVENTION

Field of the Invention

The present invention relates to a connector.

Description of Related Arts

In a connector disclosed by Japanese Unexamined Patent Publication No. 2020-115409, a retainer is inserted in a retainer disposition portion of a case. When the retainer is inserted, a full-engagement claw of the retainer rides over and engages with an engagement portion of each opening portion in right and left sidewall portions of the case, and the retainer is placed at a disposition position.

A through hole that passes through the sidewall of the retainer in a front-rear direction is formed, and this through hole is a long hole that is long upwardly and downwardly. A beam portion is formed at the sidewall of the retainer along a longitudinal direction (up-down direction) of the long hole (through hole). The beam portion is supported at both ends in the up-down direction, and a full-engagement claw is formed outside the beam portion so as to protrude.

However, stress concentrates on the neighborhood of a middle in the longitudinal direction of the beam portion that is supported at both ends. Therefore, stress acting on the retainer becomes high.

SUMMARY OF THE INVENTION

A preferred embodiment of the present invention provides a connector that relaxes stress acting on a retainer.

One preferred embodiment of the present invention provides a connector that includes a housing that has an engagement hole formed so as to be open in a first direction and an engagement portion disposed at each of a pair of inner wall surfaces facing each other in a second direction in an inner peripheral wall of the engagement hole where the first direction, the second direction, and a third direction are defined as mutually-orthogonal three directions and a retainer that is inserted and fitted into the engagement hole from the first direction. The retainer includes a pair of first outer surfaces facing each other in the first direction, a pair of second outer surfaces facing each other in the second direction, a pair of third outer surfaces facing each other in the third direction, a long hole that is adjacent to each of the second outer surfaces, that passes through the third outer surface in the third direction and that extends in the first direction defined as a longitudinal direction. The retainer additionally includes a beam portion that is formed between the long hole and a corresponding one of the second outer surfaces, that extends in the first direction defined as a longitudinal direction, and that is supported at both ends by a pair of longitudinal-direction end portions, an engagement projection that protrudes outwardly from an intermediate portion in the longitudinal direction of the beam portion and that engages with a corresponding one of the engagement portions, and a stress relaxation structure that relaxes stress acting on the intermediate portion in the longitudinal direction of the beam portion. The stress relaxation structure includes a hole expanding portion that expands at least one of the pair of longitudinal-direction end portions of the long hole in a lateral direction.

According to this configuration, the longitudinal-direction end portion of the beam portion and a portion that supports this are easily deformed in the peripheral portion of the longitudinal-direction end portion of the long hole expanded by the hole expanding portion (stress relaxation structure). Hence, stress concentration on the intermediate portion in the longitudinal direction of the beam portion is relaxed, and therefore it is possible to relax stress acting on the retainer.

In one preferred embodiment, the stress relaxation structure includes a hollowed portion that has a predetermined separation distance in the first direction from at least one of the pair of longitudinal-direction end portions of the long hole and that passes through the pair of third outer surfaces in the third direction and a leg portion that is formed between the hollowed portion and at least one of the pair of longitudinal-direction end portions of the long hole, that extends in a lateral direction from at least one of the pair of longitudinal-direction end portions of the beam portion and supports the beam portion, and whose thickness in the first direction is adjusted by the predetermined separation distance.

According to this configuration, the thickness of the leg portion extending in the lateral direction from the longitudinal-direction end portion of the beam portion is adjusted by setting the predetermined distance that is a separation distance in the first direction between the longitudinal-direction end portion of the long hole and the hollowed portion. Hence, it is possible to easily deform the leg portion and to relax stress concentration in the intermediate portion in the longitudinal direction of the beam portion while dispersing the stress.

In one preferred embodiment, the hollowed portion includes a guide hole into which a terminal is inserted. According to this configuration, the guide hole that is originally disposed in the retainer is used as the hollowed portion, and therefore it is possible to simplify the structure.

In one preferred embodiment, the hollowed portion includes a recessed groove formed at the second outer surface. According to this configuration, it is possible to relax the concentration of stress of the beam portion by means of a simple structure using the recessed groove as the hollowed portion.

In one preferred embodiment, the longitudinal-direction end portion of the long hole expanded by the hole expanding portion is disposed so as to be adjacent to a corner portion formed by the first outer surface and by the second outer surface. The stress relaxation structure includes a leg portion that is formed between the first outer surface and the longitudinal-direction end portion of the long hole expanded by the hole expanding portion and that extends in a lateral direction from a corresponding one of the longitudinal-direction end portions of the beam portion and supports the beam portion.

According to this configuration, it is possible to easily deform the leg portion extending in the lateral direction from the longitudinal-direction end portion of the beam portion, and it is possible to relax the concentration of stress of the beam portion while dispersing the stress by means of a simple structure in which the longitudinal-direction end portion of the long hole expanded by the hole expanding portion is disposed close to the corner portion.

In one preferred embodiment, a cutout recessed portion that is adjacent to a third-direction side of the beam portion, and that communicates with the long hole, and that adjusts a width in the third direction of the beam portion is formed at the second outer surface. According to this configuration, it is possible to easily adjust the flexibility of the beam portion by means of a simple structure including the cutout recessed portion, and it is possible to easily adjust a force (insertion force) required to insert the retainer into the engagement hole.

One preferred embodiment of the present invention provides a connector including a housing that has an engagement hole formed so as to be open in a first direction and an engagement portion disposed at each of a pair of inner wall surfaces facing each other in a second direction in an inner peripheral wall of the engagement hole where the first direction, the second direction, and a third direction are defined as mutually-orthogonal three directions and a retainer that is inserted and fitted into the engagement hole from the first direction. The retainer includes a pair of first outer surfaces facing each other in the first direction, a pair of second outer surfaces facing each other in the second direction, a pair of third outer surfaces facing each other in the third direction, a long hole that is adjacent to each of the second outer surfaces, that passes through the third outer surface in the third direction and that extends in the first direction defined as a longitudinal direction. The retainer additionally includes a beam portion that is formed between the long hole and a corresponding one of the second outer surfaces, that extends in the first direction defined as a longitudinal direction, and that is supported at both ends by a pair of longitudinal-direction end portions, an engagement projection that protrudes outwardly from an intermediate portion in the longitudinal direction of the beam portion and that engages with a corresponding one of the engagement portions, and a stress relaxation structure that relaxes stress acting on the intermediate portion in the longitudinal direction of the beam portion.

According to this configuration, stress concentration on the intermediate portion in the longitudinal direction of the beam portion is relaxed, and therefore it is possible to relax stress acting on the retainer.

BRIEF DESCRIPTION OF THE DRAWINGS

FIG. 9A shows a tentative-engagement state of the retainer, and FIG. 9B shows a full-engagement state of the retainer.

DETAILED DESCRIPTION OF THE PREFERRED EMBODIMENT

A preferred embodiment in which the present invention has been embodied will be hereinafter described with reference to the drawings.

Figure 1:
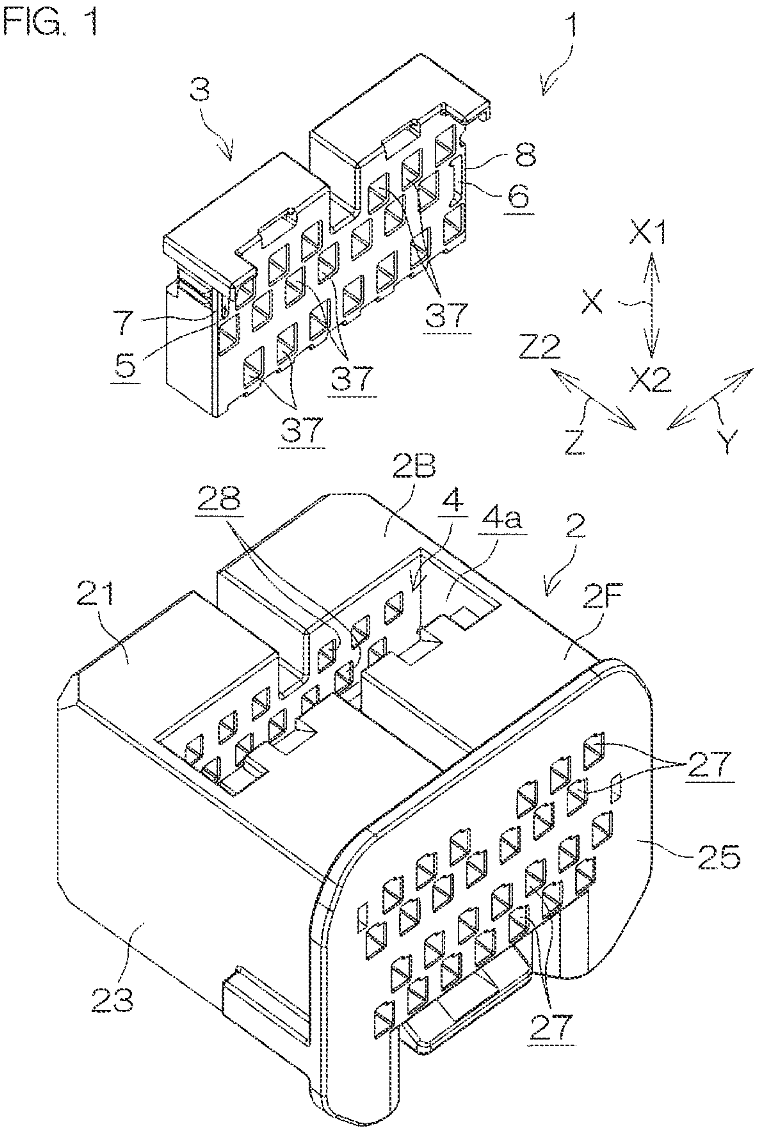
FIG. 1 is an exploded perspective view of a connector according to a preferred embodiment of the present invention.

FIG. 1 is an exploded perspective view of a connector according to the preferred embodiment of the present invention. The connector 1 is composed of a housing 2 and a retainer 3 as shown in FIG. 1.

An up-down direction X (first direction), a right-left direction Y (second direction), and a front-rear direction Z (third direction) are hereinafter described as mutually-orthogonal three directions. It should be noted that when this connector 1 is attached to a corresponding device, the first direction, the second direction, and the third direction that are mutually-orthogonal three directions can be set so as to take desired directions, respectively.

Next, the housing 2 will be described.

Figure 2A:
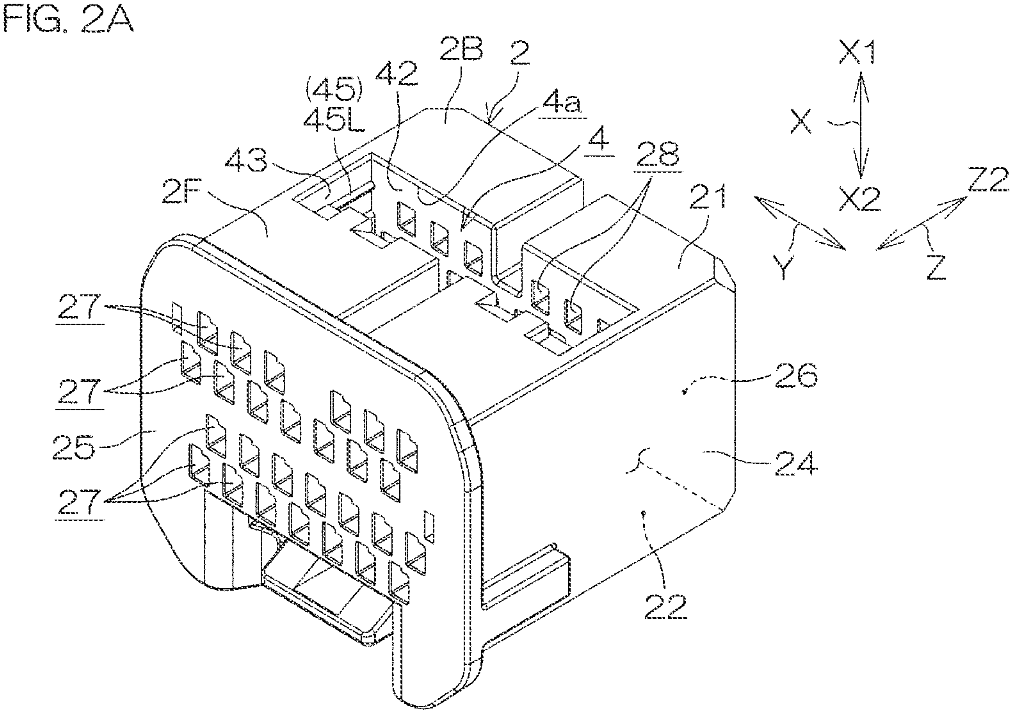
FIG. 2A and FIG. 2B are perspective views of a housing seen from mutually different angles.
Figure 2B:
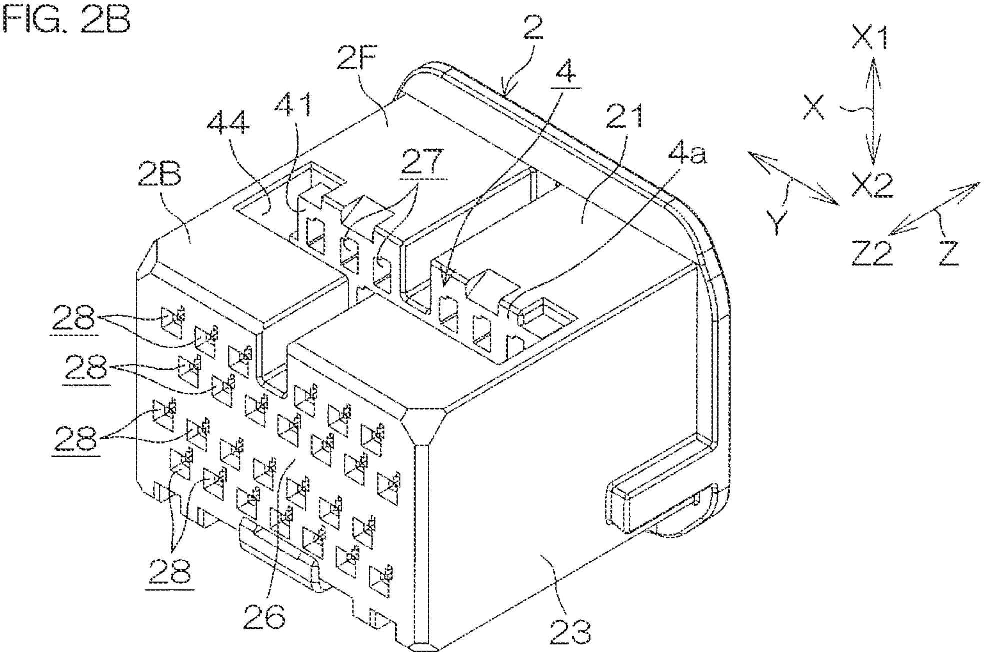
Figure 3A:
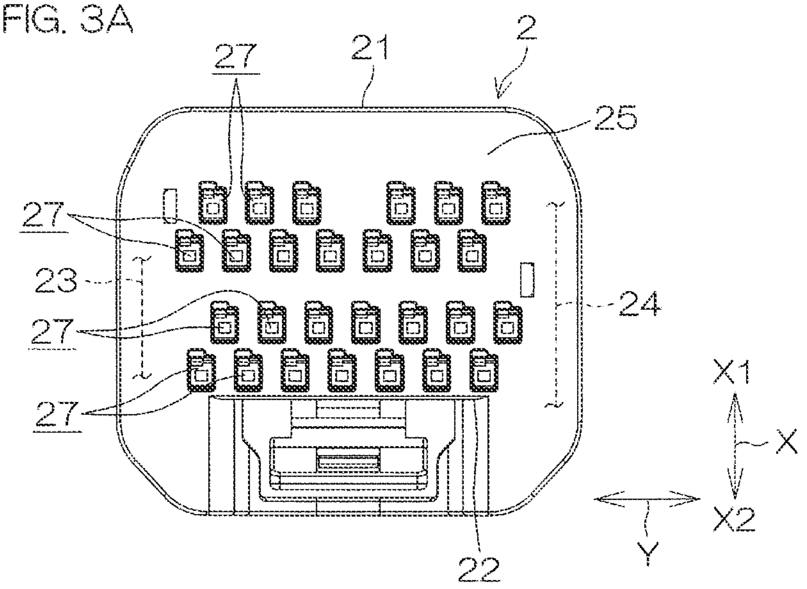
FIG. 3A is a front view of the housing.
Figure 3B:
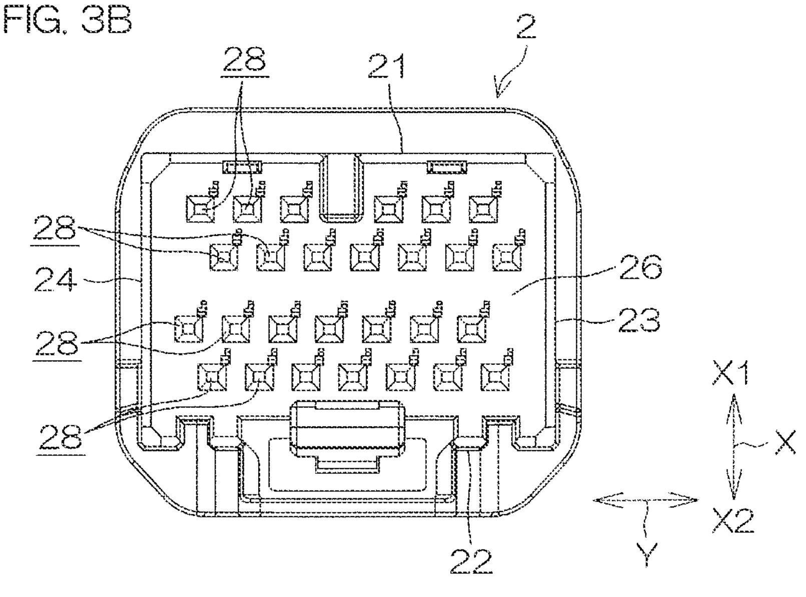
FIG. 3B is a rear view of the housing.
Figure 4A:
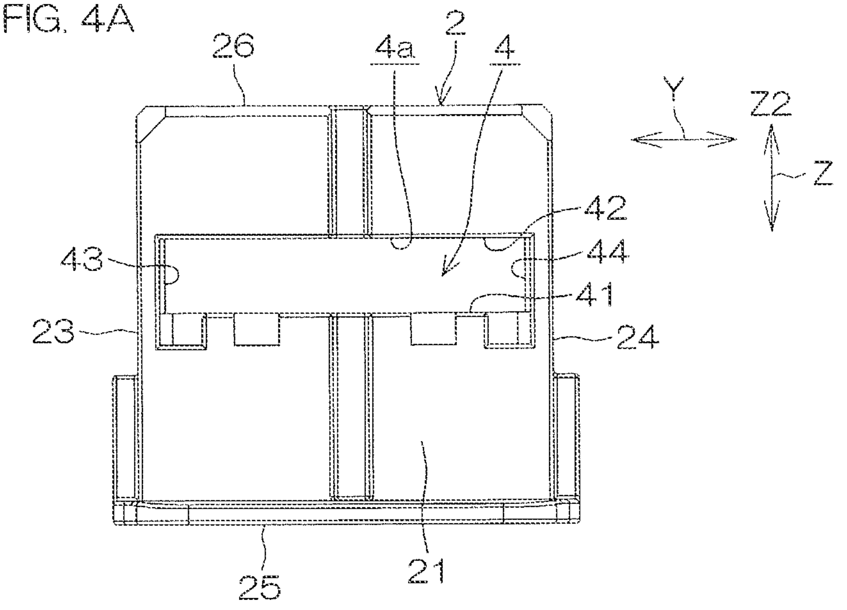
FIG. 4A is a plan view of the housing.
Figure 4B:
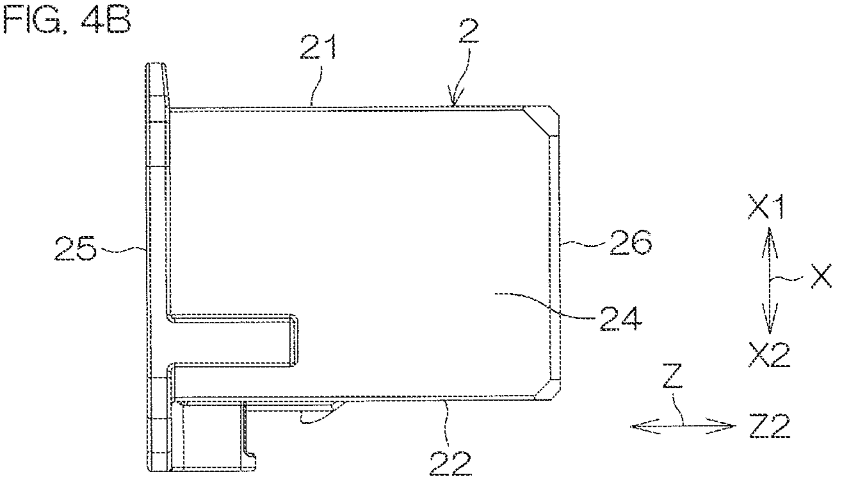
FIG. 4B is a right side view of the housing.

FIG. 2A and FIG. 2B are perspective views of the housing 2 seen from mutually different angles. FIG. 3A is a front view of the housing 2, and FIG. 3B is a rear view of the housing 2. FIG. 4A is a plan view of the housing 2, and FIG. 4B is a right side view of the housing 2.

The housing 2 is a substantially rectangular-parallelepiped-shaped block body formed by integrally molding an insulating synthetic resin material with reference to FIG. 2A, FIG. 2B, FIG. 3A, FIG. 3B, FIG. 4A, and FIG. 4B. The housing 2 includes upper and lower surfaces 21, 22, left and right side surfaces 23, 24, front and rear surfaces 25, 26, front and rear terminal insertion holes 27, 28, and an engagement hole 4. The front surface 25 is formed by a front surface of a plate-shaped portion that projects in all directions with respect to the upper surface 21, the lower surface 22, the left side surface 23, and the right side surface 24.

The engagement hole 4 is a hole that is bored in the upper surface 21 at an opening portion 4*a*, and whose depth direction is the up-down direction X, and that has a substantially rectangular cross section. The engagement hole 4 is open toward an upper side X1, which is one of the two sides in the up-down direction X, through the opening portion 4*a* of the upper surface 21. The retainer 3 is inserted and fitted into the engagement hole 4 from the upper side X1 toward a lower side X2 through the opening portion 4*a* (see FIG. 1).

As shown in FIG. 4A, an inner peripheral wall of the engagement hole 4 includes front and rear inner wall surfaces 41 and 42 that face each other in the front-rear direction Z and left and right inner sidewall surfaces 43 and 44 that face each other in the right-left direction Y. Engagement portions 45L and 45R each of which locks the retainer 3 are formed at the left and right inner sidewall surfaces 43 and 44, respectively, so as to protrude therefrom.

The engagement portion 45L (see FIG. 2A, FIG. 8A, and FIG. 9A) of the left inner sidewall surface 43 is disposed near the opening portion 4*a*. The engagement portion 45R (see FIG. 8A) of the right inner sidewall surface 44 is disposed near a central part in the depth direction (up-down direction X) of the engagement hole 4. Each of the engagement portions 45L and 45R is a projection that has a V-shaped cross section and that extends in the front-rear direction. The engagement portions 45L and 45R are hereinafter referred to collectively as the engagement portion 45 if necessary.

As shown in FIG. 2A, FIG. 2B, FIG. 3A, and FIG. 3B, the front terminal insertion hole 27 is formed in a front portion 2F disposed at a more forward position in the housing 2 than the engagement hole 4. The front terminal insertion hole 27 passes through the front portion 2F in the front-rear direction Z so as to be bored in the front surface 25 and in the front inner wall surface 41 of the engagement hole 4. The front terminal insertion holes 27 are arranged so as to make a row of terminal insertion holes in the right-left direction Y, and, for example, four rows of terminal insertion holes are arranged in the up-down direction.

The rear terminal insertion hole 28 is formed in a rear portion 2B disposed at a more rearward position on a rear side Z2 in the housing 2 than the engagement hole 4. The rear terminal insertion hole 28 passes through the rear portion 2B in the front-rear direction Z so as to be bored in the rear surface 26 and in the rear inner wall surface 42 of the engagement hole 4. The rear terminal insertion holes 28 are arranged so as to make a row of terminal insertion holes in the right-left direction Y, and, for example, four rows of terminal insertion holes are arranged in the up-down direction. Each of the rear terminal insertion holes 28 is disposed at the same position as a corresponding one of the front terminal insertion holes 27 with respect to positions in the up-down direction X and in the right-left direction Y when seen in the front-rear direction Z.

Next, the retainer 3 will be described.

Figure 5A:
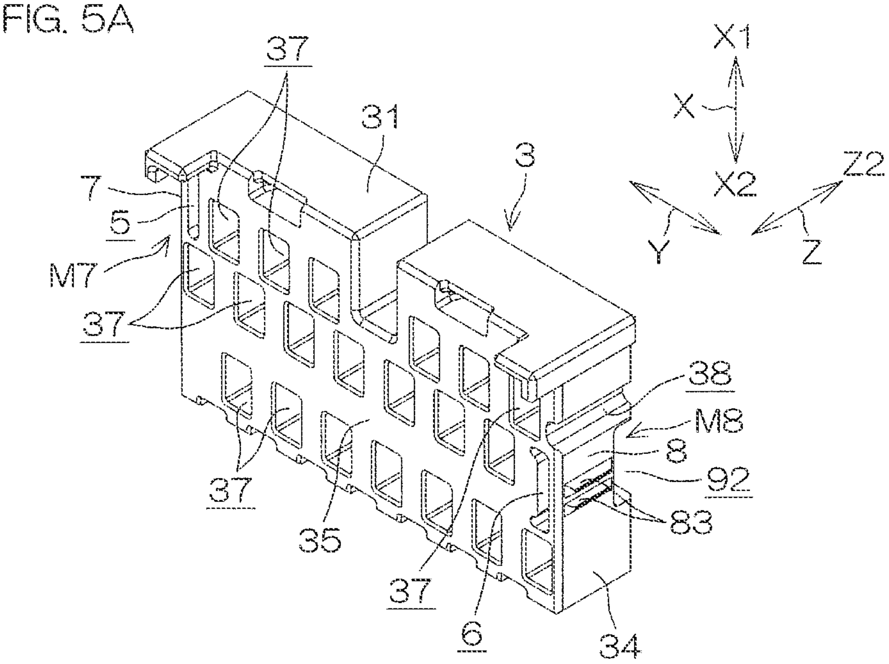
FIG. 5A and FIG. 5B are perspective views of a retainer seen from mutually different angles.
Figure 5B:
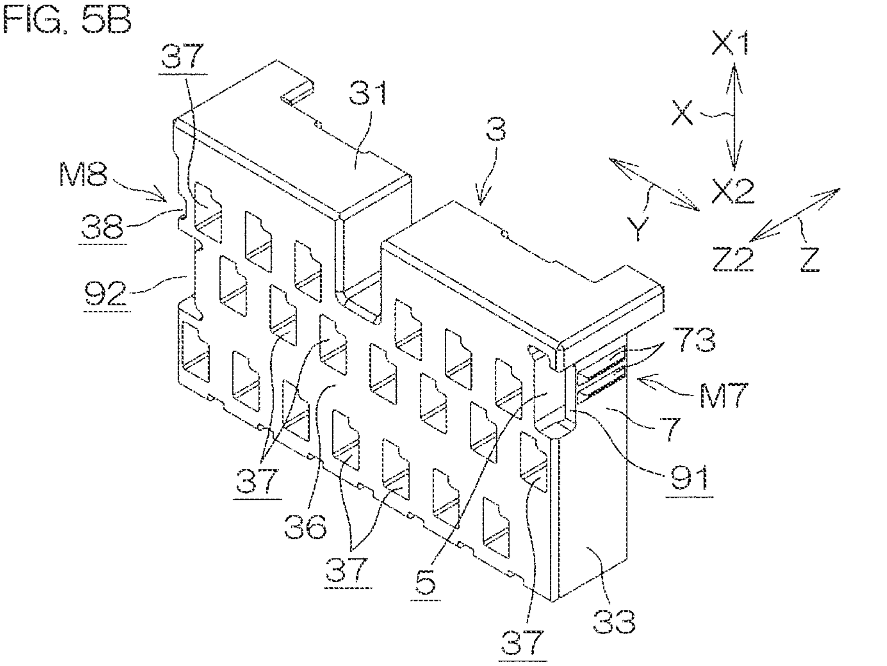
Figure 6A:
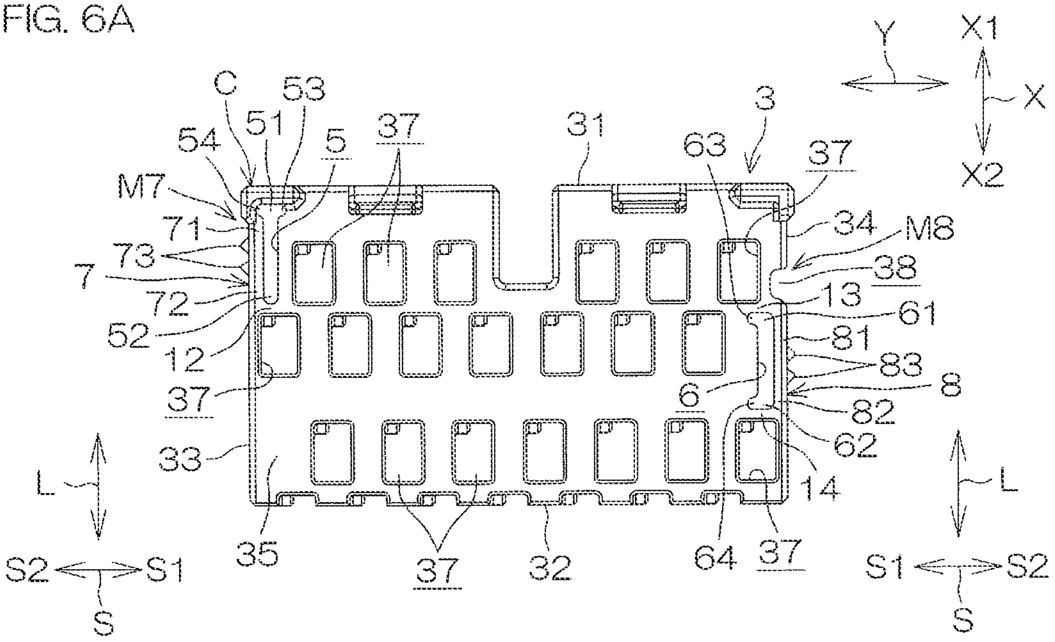
FIG. 6A is a front view of the retainer.
Figure 6B:
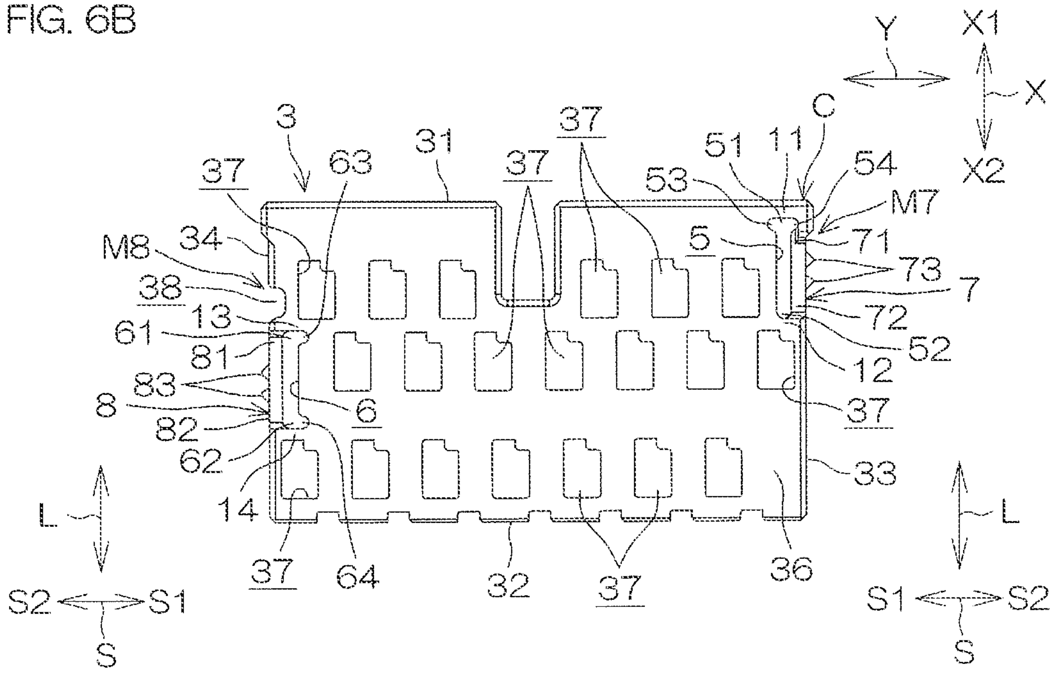
FIG. 6B is a rear view of the retainer.
Figure 7A:
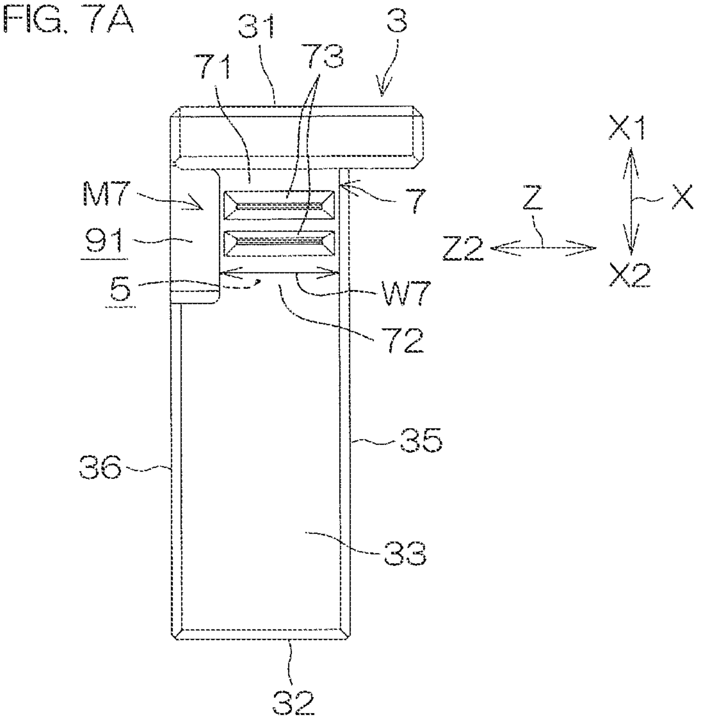
FIG. 7A is a left front view of the retainer.
Figure 7B:
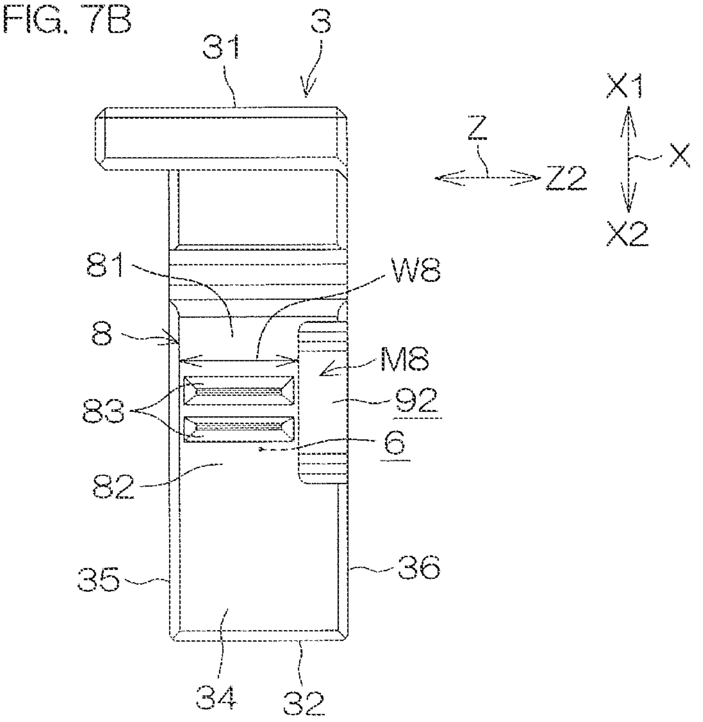
FIG. 7B is a right side view of the retainer.

FIG. 5A and FIG. 5B are perspective views of the retainer 3 seen from mutually different angles. FIG. 6A is a front view of the retainer 3, and FIG. 6B is a rear view of the retainer 3. FIG. 7A is a left front view of the retainer 3, and FIG. 7B is a right side view of the retainer 3.

The retainer 3 is a substantially rectangular-parallelepiped-shaped block body formed by integrally molding an insulating synthetic resin material with reference to FIG. 5A, FIG. 5B, FIG. 6A, FIG. 6B, FIG. 7A, and FIG. 7B. The retainer 3 includes upper and lower surfaces 31 and 32 (which correspond to a pair of first outer surfaces facing each other in the up-down direction X), left and right side surfaces 33 and 34 (which correspond to a pair of second outer surfaces facing each other in the right-left direction Y), front and rear surfaces 35 and 36 (which correspond to a pair of third outer surfaces facing each other in the front-rear direction Z), and a plurality of rows of guide holes 37.

The guide hole 37 is disposed in the same arrangement as the front terminal insertion hole 27 and the rear terminal insertion hole 28 of the housing 2. The front terminal insertion hole 27 and the rear terminal insertion hole 28 of the housing 2 are allowed to communicate with each other through the guide hole 37 of the retainer 3 in a state in which the retainer 3 has been inserted and fitted in the engagement hole 4.

An engagement portion (not shown) that locks a terminal (not shown), which is inserted into the guide hole 37, is formed at an inner surface of the guide hole 37 so as to protrude therefrom. The engagement portion locks the terminal in a state in which the retainer 3 is in a full-engagement state (see FIG. 9B), whereas the engagement portion releases the locking of the terminal in a state in which the retainer 3 is in a tentative-engagement state (see FIG. 9A).

Additionally, the retainer 3 includes a pair of long holes 5 and 6 that are a pair of through holes, a pair of beam portions 7 and 8, and stress relaxation structures M7 and M8 that relax stress acting on each of the beam portions 7 and 8.

First, a structure around the left beam portion 7 will be described.

Figure 8A:
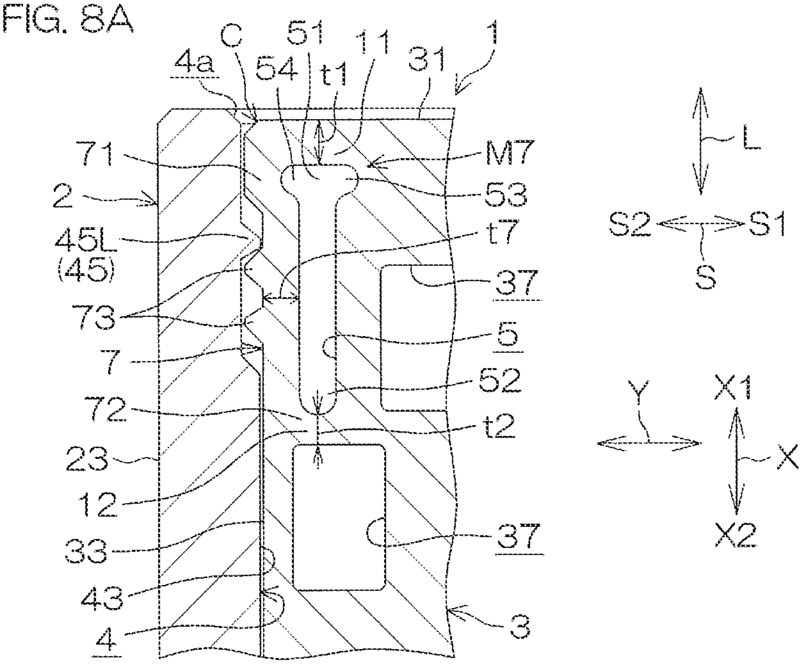
FIG. 8A and FIG. 8B are enlarged-cross-sectional views of peripheral parts of left and right beam portions that are in a full-engagement state.

FIG. 8A is an enlarged cross-sectional view of a peripheral part of the left beam portion 7 being in a full-engagement state. As shown in FIG. 8A, the left long hole 5 is a through hole that is closer to the left side surface 33 (second outer surface) and that passes through the front and rear surfaces 35 and 36 (a pair of third outer surfaces) in the front-rear direction Z, and is a long hole that longitudinally extends when the up-down direction X is defined as a longitudinal direction L.

The long hole 5 has a pair of longitudinal-direction end portions 51 and 52 that face each other in the longitudinal direction L. The long hole 5 additionally has a hole expanding portion 53 that expands one of the longitudinal-direction end portions 51 to one side S1 in a lateral direction S (side opposite to the left-side-surface-33 side to which the long hole 5 is closer) and a hole expanding portion 54 that expands the longitudinal-direction end portion 51 to the other side S2 in the lateral direction S (the left-side-surface-33 side to which the long hole 5 is closer). In other words, the long hole 5 is formed in the shape of the capital letter T.

The left beam portion 7 is formed between the long hole 5 and the left side surface 33 along the left long hole 5. The beam portion 7 longitudinally extends when the up-down direction X is defined as a longitudinal direction L. The beam portion 7 has a pair of longitudinal-direction end portions 71 and 72 facing each other in the longitudinal direction L, and is supported at both ends by means of the pair of longitudinal-direction end portions 71 and 72. A pair of engagement projections 73 that protrude outwardly from an intermediate portion in the longitudinal direction L of the beam portion 7 are formed.

The stress relaxation structure M7 that relaxes stress acting on the left beam portion 7 includes the aforementioned hole expanding portions 53 and 54 and leg portions 11 and 12 that have experienced a thickness adjustment.

In detail, one of the longitudinal-direction end portions 51 that has been expanded by the expanding portions 53 and 54 is disposed close to a corner portion C formed by the upper surface 31 (first outer surface) and by the left side surface 33 (second outer surface). The leg portion 11 that extends from one of the longitudinal-direction end portions 71 of the beam portion 7 to both sides S1 and S2 in the lateral direction S and that supports the beam portion 7 is formed between the upper surface 31 and one of the longitudinal-direction end portions 51 of the long hole 5.

The thickness t1 of the leg portion 11 is adjusted by a separation distance in the up-down direction X between the upper surface 31 and one of the longitudinal-direction end portions 51. The leg portion 11 is easily deformed by making adjustment so that the thickness t1 of the leg portion 11 becomes smaller. Hence, the stress of the beam portion 7 is dispersed, and stress concentration on the intermediate portion in the longitudinal direction of the beam portion 7 is relaxed.

The guide hole 37 is disposed so as to be close to the lower side X2 of the other one of the longitudinal-direction end portions 52 of the long hole 5. The leg portion 12 that extends in the lateral direction S from the other one of the longitudinal-direction end portions 72 of the beam portion 7 and that supports the beam portion 7 through the other one of the longitudinal-direction end portions 72 is formed between the guide hole 37 and the other one of the longitudinal-direction end portions 52 of the long hole 5.

The thickness t2 of the leg portion 12 is adjusted by a separation distance in the up-down direction X between the other one of the longitudinal-direction end portions 52 of the long hole 5 and the guide hole 37 close thereto. The leg portion 12 is easily deformed by making adjustment so that the thickness t2 becomes smaller. Hence, the stress of the beam portion 7 is dispersed, and stress concentration on the intermediate portion in the longitudinal direction of the beam portion 7 is relaxed.

There is a case in which the thickness t1, t2 of each of the leg portions 11 and 12 is set to have a predetermined thickness falling within the range of 80% to 150% with respect to a standard thickness t7 of the beam portion 7 (thickness in the right-left direction Y of a part that does not have the engagement projection 73), or 80% to 120% with respect thereto, or 90% to 110% with respect thereto, or 95% to 105% with respect thereto, or an equal thickness with respect thereto.

Figure 9A:
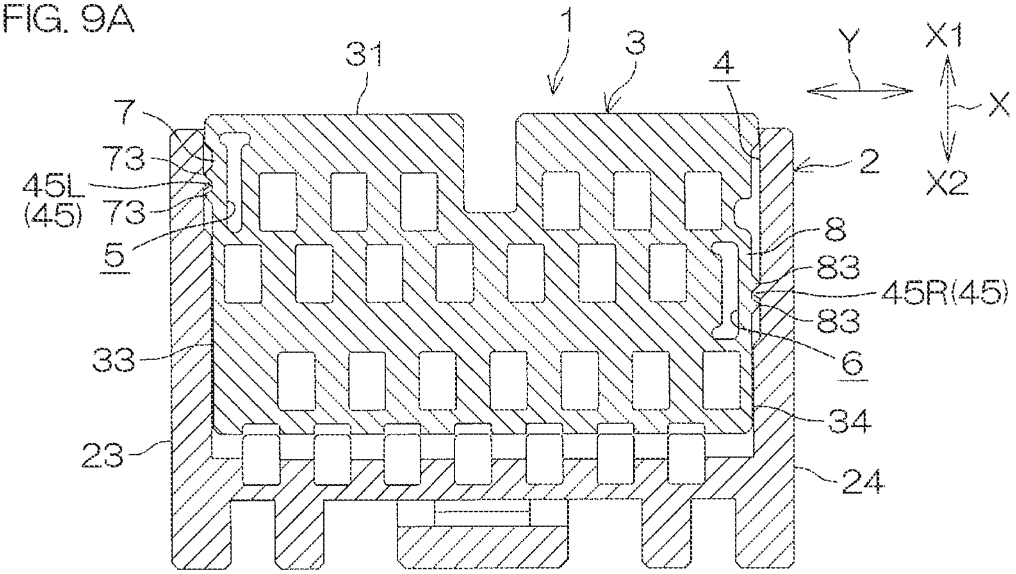
FIG. 9A and FIG. 9B are cross-sectional views each of which shows the housing to which the retainer has been attached.
Figure 9B:
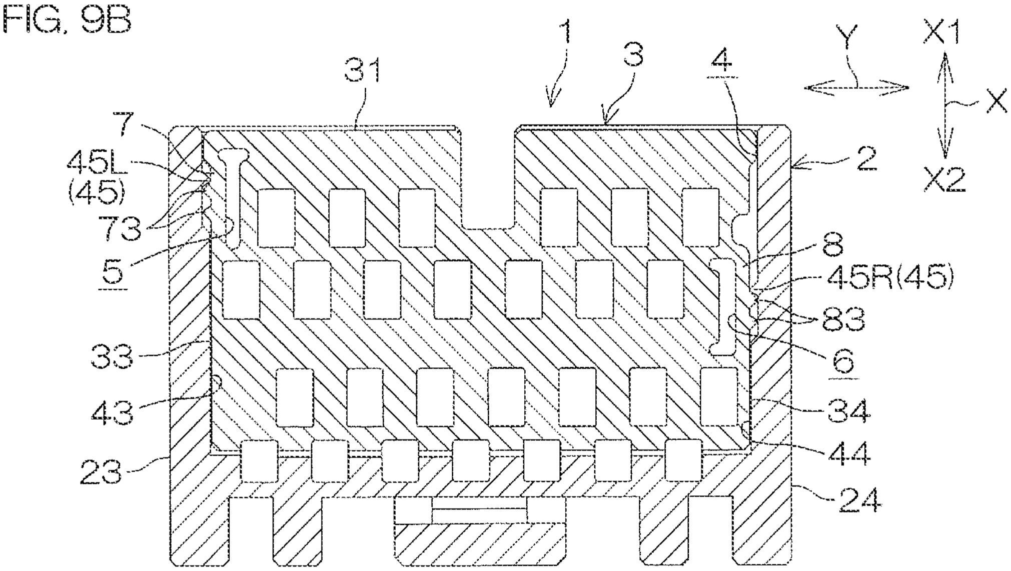

Each of the pair of engagement projections 73 of the beam portion 7 is a projection that has a V-shaped cross section extending in the front-rear direction Z and that is disposed so as to be adjacent to each other in the up-down direction X. The retainer 3 reaches a tentative-engagement state by allowing the lower engagement projection 73 to ride over and engage with the engagement portion 45L as shown in FIG. 9A. Additionally, the retainer 3 reaches a full-engagement state by allowing the upper engagement projection 73 to ride over and engage with the engagement portion 45L as shown in FIG. 8A and FIG. 9B. The beam portion 7 is bent when the engagement projection 73 rides over the engagement portion 45L.

As shown in FIG. 5B and FIG. 7A, a cutout recessed portion 91 is formed at the left side surface 33 so as to be adjacent to the rear side Z2 in the front-rear direction Z of the beam portion 7. The cutout recessed portion 91 communicates with the long hole 5, and functions to adjust the width W7 in the front-rear direction Z of the beam portion 7.

Next, a structure around the right beam portion 8 will be described.

Figure 8B:
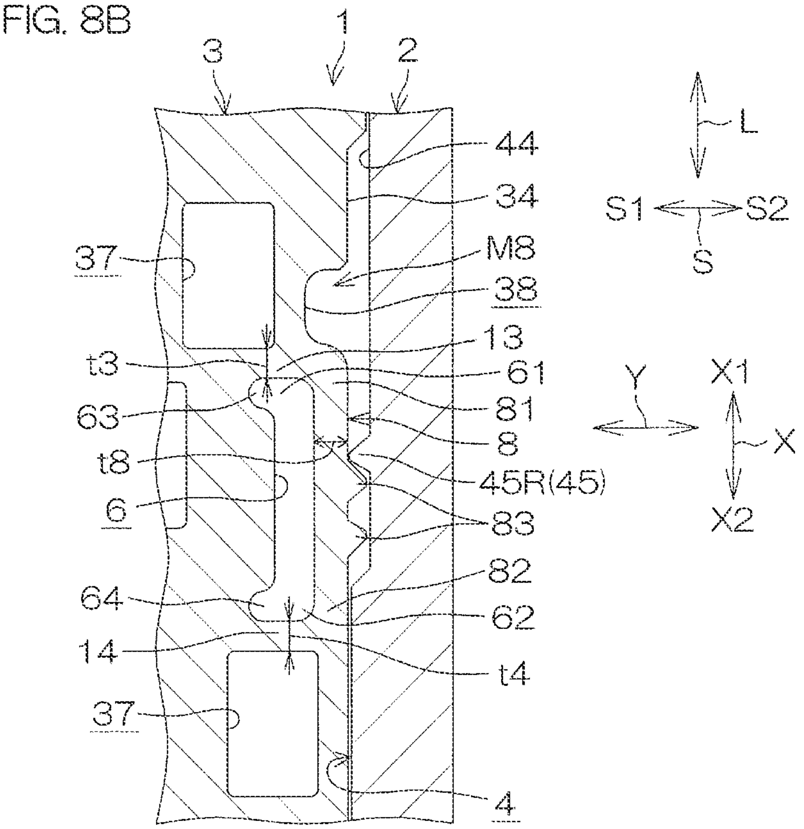

FIG. 8B is an enlarged-cross-sectional view of a peripheral part of the right beam portion 8 that is in a full-engagement state. As shown in FIG. 8B, the right long hole 6 is a through hole that is closer to the right side surface 34 (second outer surface) and that passes through the front and rear surfaces 35 and 36 (a pair of third outer surfaces) in the front-rear direction Z, and is a long hole that longitudinally extends when the up-down direction X is defined as a longitudinal direction L.

The long hole 6 has a pair of longitudinal-direction end portions 61 and 62 that face each other in the longitudinal direction L. The long hole 5 additionally has a pair of hole expanding portions 63 and 64 that expand the pair of longitudinal-direction end portions 61 and 62 to one side S1 in the lateral direction S (side opposite to the right-side-surface-34 side to which the long hole 6 is closer). In other words, the long hole 6 is formed in the shape of a groove.

The right beam portion 8 is formed between the long hole 5 and the right side surface 34 along the right long hole 5. The beam portion 8 longitudinally extends when the up-down direction X is defined as a longitudinal direction L. The beam portion 8 has a pair of longitudinal-direction end portions 81 and 82 facing each other in the longitudinal direction L, and is supported at both ends by means of the pair of longitudinal-direction end portions 81 and 82. A pair of engagement projections 83 that protrude outwardly from an intermediate portion in the longitudinal direction L of the beam portion 8 are formed.

The stress relaxation structure M8 that relaxes stress acting on the right beam portion 8 includes the aforementioned hole expanding portions 63 and 64, the guide hole 37 and a recessed groove 38 each of which serves as a hollowed portion, and leg portions 13 and 14 that have experienced a thickness adjustment.

In detail, the guide hole 37 (hollowed portion) and the recessed groove 38 (hollowed portion) formed at the right side surface 34 are disposed close to the upper side X1 of one of the longitudinal-direction end portions 61 of the long hole 6 expanded by the hole expanding portion 63.

The leg portion 13 that extends from one of the longitudinal-direction end portions 81 of the beam portion 8 to one side S1 in the lateral direction S and that supports the beam portion 8 through the longitudinal-direction end portion 81 is formed between one of the longitudinal-direction end portions 61 of the long hole 6 and the hollowed portion (the guide hole 37 and the recessed groove 38).

The thickness t3 of the leg portion 13 is adjusted by a separation distance in the up-down direction X between one of the longitudinal-direction end portions 61 of the long hole 6 and the hollowed portion (the guide hole 37 and the recessed groove 38) adjacent to the upper side X1 of the longitudinal-direction end portion 61. The leg portion 13 is easily deformed by making adjustment so that the thickness t3 of the leg portion 13 becomes smaller. Hence, the stress of the beam portion 8 is dispersed, and stress concentration on the intermediate portion in the longitudinal direction of the beam portion 8 is relaxed.

The guide hole 37 (hollowed portion) is disposed so as to be close to the lower side X2 of the other one of the longitudinal-direction end portions 62 of the long hole 6. The leg portion 14 that extends from the other one of the longitudinal-direction end portions 82 of the beam portion 8 to one side S1 in the lateral direction S and that supports the beam portion 8 through the longitudinal-direction end portion 82 is formed between the guide hole 37 and the other one of the longitudinal-direction end portions 62 of the long hole 6.

The thickness t4 of the leg portion 14 is adjusted by a separation distance in the up-down direction X between the other one of the longitudinal-direction end portions 62 of the long hole 6 and the guide hole 37 close thereto. The leg portion 14 is easily deformed by making adjustment so that the thickness t4 becomes smaller. Hence, the stress of the beam portion 8 is dispersed, and stress concentration on the intermediate portion in the longitudinal direction of the beam portion 8 is relaxed.

There is a case in which the thickness t3, t4 of each of the leg portions 13 and 14 is set to have a predetermined thickness falling within the range of 80% to 150% with respect to a standard thickness t8 of the beam portion 8 (thickness in the right-left direction Y of a part that does not have the engagement projection 83), or 80% to 120% with respect thereto, or 90% to 110% with respect thereto, or 95% to 105% with respect thereto, or an equal thickness with respect thereto.

Each of the pair of engagement projections 83 of the beam portion 8 is a projection that has a V-shaped cross section extending in the front-rear direction Z and that is disposed so as to be adjacent to each other in the up-down direction X. The retainer 3 reaches a tentative-engagement state as shown in FIG. 9A by allowing the lower engagement projection 83 to ride over and engage with the engagement portion 45R. Additionally, the retainer 3 reaches a full-engagement state as shown in FIG. 8B and FIG. 9B by allowing the upper engagement projection 83 to ride over and engage with the engagement portion 45R.

As shown in FIG. 5A and FIG. 7B, a cutout recessed portion 92 is formed at the right side surface 34 so as to be adjacent to the rear side Z2 in the front-rear direction Z of the beam portion 8. The cutout recessed portion 92 communicates with the long hole 6, and functions to adjust the width W8 in the front-rear direction Z of the beam portion 8.

In the present preferred embodiment, the following operational effects are fulfilled.

In detail, the longitudinal-direction end portion 71; 81, 82 of the beam portion 7, 8 and a portion that supports this are easily deformed in the peripheral portion of the longitudinal-direction end portion 51; 61, 62 of the long hole 5, 6 expanded by the hole expanding portion 53, 54; 63, 64 (stress relaxation structure M7, M8) as shown in FIG. 8A and FIG. 8B. Hence, stress concentration on the intermediate portion in the longitudinal direction of the beam portion 7, 8 is relaxed, and therefore it is possible to realize the connector 1 that relaxes stress acting on the retainer 3.

Additionally, with respect to the stress relaxation structure M8 for the beam portion 8, the thickness t3 of the leg portion 13 extending in the lateral direction S from one of the longitudinal-direction end portions 81 of the beam portion 8 is adjusted by setting a separation distance in the up-down direction X between one of the longitudinal-direction end portions 61 of the long hole 6 and the hollowed portion (the guide hole 37 and the recessed groove 38) close to the longitudinal-direction end portion 61. Additionally, the thickness t4 of the leg portion 14 extending in the lateral direction S from the other one of the longitudinal-direction end portions 81 of the beam portion 8 is adjusted by setting a separation distance in the up-down direction X between the other one of the longitudinal-direction end portions 62 of the long hole 6 and the hollowed portion (the guide hole 37) close to the longitudinal-direction end portion 62. Hence, it is possible to easily deform the leg portion 13, 14 and to relax stress concentration while dispersing the stress of the beam portion 8.

Likewise, with respect to the stress relaxation structure M7 for the beam portion 7, the thickness t2 of the leg portion 12 extending in the lateral direction S from the other one of the longitudinal-direction end portions 72 of the beam portion 7 is adjusted by setting a separation distance in the up-down direction X between the other one of the longitudinal-direction end portions 52 of the long hole 5 and the hollowed portion (the guide hole 37) close to the longitudinal-direction end portion 52. Hence, it is possible to easily deform the leg portion 12 and to relax stress concentration while dispersing the stress of the beam portion 7.

Additionally, it is possible to simplify the structure by using the guide hole 37 that is originally disposed in the retainer 3 as the hollowed portion. Additionally, it is possible to contribute to relaxing the concentration of stress of the beam portion 8 by means of a simple structure using the recessed groove 38 formed at the right side surface 34 as the hollowed portion.

Additionally, with respect to the stress relaxation structure M7 for the beam portion 7, it is possible to easily deform the leg portion 11 extending in the lateral direction S from one of the longitudinal-direction end portions 71 of the beam portion 7, and is possible to relax the concentration of stress while dispersing the stress of the beam portion 7 by means of a simple structure in which one of the longitudinal-direction end portions 51 of the long hole 5 expanded by the hole expanding portion 53, 54 is disposed close to the corner portion C.

As shown in FIG. 5A, FIG. 5B, FIG. 7A, and FIG. 7B, the cutout recessed portions 91 and 92 that are adjacent to the rear side Z2 of the corresponding beam portions 7 and 8 and that communicate with the corresponding long holes 5 and 6 are formed at the left and right side surfaces 33 and 34. It is possible to adjust the widths W7 and W8 in the front-rear direction Z of the corresponding beam portions 7 and 8 by means of the cutout recessed portions 91 and 92, respectively (see FIG. 7A and FIG. 7B). Therefore, it is possible to easily adjust the flexibility of the beam portions 7 and 8 by means of a simple structure including the cutout recessed portions 91 and 92, and it is possible to easily adjust a force (insertion force) required to insert and fit the retainer 3 into the engagement hole 4.

Figure 10A:
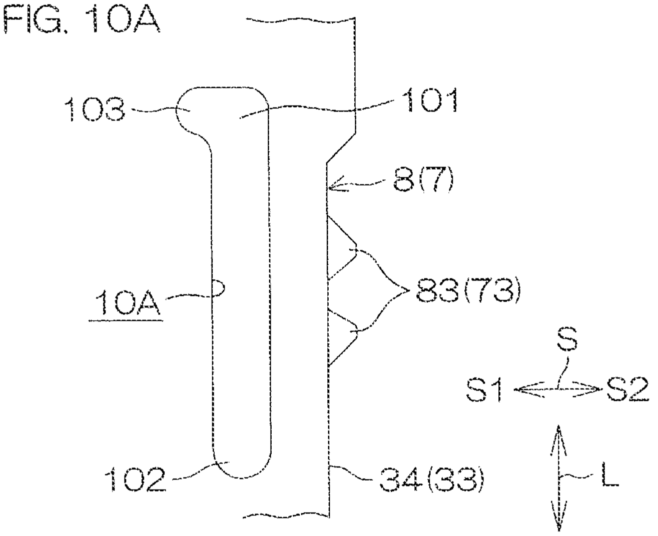
FIG. 10A and FIG. 10B are schematic views around a long hole of a retainer that is a modification.
Figure 10B:
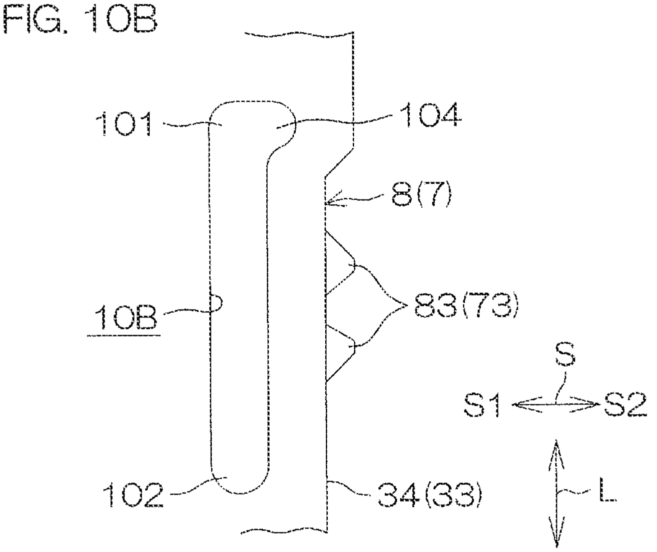

The example of the T-shaped long hole (see the long hole 5 of FIG. 8A) and the example of the groove-shaped long hole (see the long hole 6 of FIG. 8B) have been shown as a long hole, and yet, without being limited to these examples, it is permissible to use an angle-shaped long hole 10A, which has a pair of longitudinal-direction end portions 101 and 102 and which expands one 101 of the longitudinal-direction end portions (alternatively, the other one 102 of the longitudinal-direction end portions) to only one side S1 in the lateral direction S by means of a hole expanding portion 103, for example, as a long hole adjacent to the beam portion 7 or 8 as shown in FIG. 10A that is a schematic view, or it is permissible to use an angle-shaped long hole 10B, which expands one 101 of the longitudinal-direction end portions (alternatively, the other one 102 of the longitudinal-direction end portions) to only the other side S2 in the lateral direction S by means of a hole expanding portion 104, for example, as a long hole adjacent to the beam portion 7 or 8 as shown in FIG. 10B that is a schematic view.

The long hole is merely required to be formed such that at least one of the longitudinal-direction end portions is expanded to at least one side in the lateral direction, and the long hole may assume the shape of the capital letter I (not shown) in addition to the T-shaped long hole, the groove-shaped long hole, and the angle-shaped long hole mentioned above. Additionally, the left and right long holes may differ in shape from each other, or may be laterally symmetrical in shape with each other. Additionally, the left and right long holes may be disposed at mutually different positions in the up-down direction, or may be disposed at the same position in the up-down direction.

Although the present invention has been described in detail according to the concrete aspects, those skilled in the art who have appreciated the aforementioned contents will easily devise its modification, variations, and equivalents. Therefore, the present invention should be within the scope of the claims and within its equivalent scope.

REFERENCE SIGNS LIST

1 connector
2 housing
3 retainer
4 engagement hole
5 long hole
6 long hole
7 beam portion
8 beam portion
10A long hole
10B long hole

11, 12, 13, 14 leg portion
31 upper surface (first outer surface)
32 lower surface (first outer surface)
33 left side surface (second outer surface)
34 right side surface (second outer surface)
35 front surface (third outer surface)
36 rear surface (third outer surface)
43 left inner sidewall surface
44 right inner sidewall surface
45L (45) engagement portion
45R (45) engagement portion
51 longitudinal-direction end portion
52 longitudinal-direction end portion
53 hole expanding portion
54 hole expanding portion
61 longitudinal-direction end portion
62 longitudinal-direction end portion
63 hole expanding portion
64 hole expanding portion
71 longitudinal-direction end portion
72 longitudinal-direction end portion
73 engagement projection
81 longitudinal-direction end portion
82 longitudinal-direction end portion
83 engagement projection
101 longitudinal-direction end portion
102 longitudinal-direction end portion
103 hole expanding portion
104 hole expanding portion
C corner portion
L longitudinal direction
M7 stress relaxation structure
M8 stress relaxation structure
S lateral direction
S1 one side
S2 other side
X up-down direction (first direction)
Y right-left direction (second direction)
Z front-rear direction (third direction)
t1, t2, t3, t4 thickness

What is claimed is:

1. A connector comprising:

a housing that has an engagement hole formed so as to be open in a first direction and an engagement portion disposed at each of a pair of inner wall surfaces facing each other in a second direction in an inner peripheral wall of the engagement hole where the first direction, the second direction, and a third direction are defined as mutually-orthogonal three directions; and a retainer that is inserted and fitted into the engagement hole from the first direction, the retainer including:

a pair of first outer surfaces facing each other in the first direction;

a pair of second outer surfaces facing each other in the second direction;

a pair of third outer surfaces facing each other in the third direction;

a long hole that is adjacent to each of the second outer surfaces, that passes through the third outer surface in the third direction and that extends in the first direction defined as a longitudinal direction;

a beam portion that is formed between the long hole and a corresponding one of the second outer surfaces, that extends in the first direction defined as a longitudinal direction, and that is supported at both ends by a pair of longitudinal-direction end portions;

an engagement projection that protrudes outwardly from an intermediate portion in the longitudinal direction of the beam portion and that engages with a corresponding one of the engagement portions; and a stress relaxation structure that relaxes stress acting on the intermediate portion in the longitudinal direction of the beam portion, the stress relaxation structure including a hole expanding portion that expands at least one of the pair of longitudinal-direction end portions of the long hole in a lateral direction.

2. The connector according to claim 1, wherein the stress relaxation structure includes:

a hollowed portion that has a predetermined separation distance in the first direction from at least one of the pair of longitudinal-direction end portions of the long hole and that passes through the pair of third outer surfaces in the third direction; and a leg portion that is formed between the hollowed portion and at least one of the pair of longitudinal-direction end portions of the long hole, that extends in a lateral direction from at least one of the pair of longitudinal-direction end portions of the beam portion and supports the beam portion, and whose thickness in the first direction is adjusted by the predetermined separation distance.

3. The connector according to claim 2, wherein the hollowed portion includes a guide hole into which a terminal is inserted.

4. The connector according to claim 2, wherein the hollowed portion includes a recessed groove formed at the second outer surface.

5. The connector according to claim 2, wherein a thickness in the first direction of the leg portion is set within a range of 80% to 150% of a standard thickness in the second direction of the beam portion.

6. The connector according to claim 1, wherein the longitudinal-direction end portion of the long hole expanded by the hole expanding portion is disposed so as to be adjacent to a corner portion formed by the first outer surface and by the second outer surface, and the stress relaxation structure includes a leg portion that is formed between the first outer surface and the longitudinal-direction end portion of the long hole expanded by the hole expanding portion and that extends in a lateral direction from a corresponding one of the longitudinal-direction end portions of the beam portion and supports the beam portion.

7. The connector according to claim 1, wherein a cutout recessed portion that is adjacent to a third-direction side of the beam portion, and that communicates with the long hole, and that adjusts a width in the third direction of the beam portion is formed at the second outer surface.

8. A connector comprising:

a housing that has an engagement hole formed so as to be open in a first direction and an engagement portion disposed at each of a pair of inner wall surfaces facing each other in a second direction in an inner peripheral wall of the engagement hole where the first direction, the second direction, and a third direction are defined as mutually-orthogonal three directions; and a retainer that is inserted and fitted into the engagement hole from the first direction, the retainer including:

a pair of first outer surfaces facing each other in the first direction;

a pair of second outer surfaces facing each other in the second direction;

a pair of third outer surfaces facing each other in the third direction;

a long hole that is adjacent to each of the second outer surfaces, that passes through the third outer surface in the third direction and that extends in the first direction defined as a longitudinal direction;

a beam portion that is formed between the long hole and a corresponding one of the second outer surfaces, that extends in the first direction defined as a longitudinal direction, and that is supported at both ends by a pair of longitudinal-direction end portions;

an engagement projection that protrudes outwardly from an intermediate portion in the longitudinal direction of the beam portion and that engages with a corresponding one of the engagement portions; and a stress relaxation structure that relaxes stress acting on the intermediate portion in the longitudinal direction of the beam portion.

* * * * *